United States Patent
Wernersson

(10) Patent No.: US 7,656,460 B2
(45) Date of Patent: Feb. 2, 2010

(54) AUTOFOCUS ASSEMBLY THAT ADJUSTS A LENS IN THE OPTICAL AXIS DIRECTION BY ALIGNMENT OF HOLES IN A SPACING RING THAT RECEIVE BALL BEARINGS

(75) Inventor: Mats Göran Henry Wernersson, Helsingborg (SE)

(73) Assignee: Sony Ericsson Mobile Communications AB, Lund (SE)

( * ) Notice: Subject to any disclaimer, the term of this patent is extended or adjusted under 35 U.S.C. 154(b) by 316 days.

(21) Appl. No.: 11/842,223

(22) Filed: Aug. 21, 2007

(65) Prior Publication Data

US 2009/0051776 A1 Feb. 26, 2009

(51) Int. Cl.
G03B 13/00 (2006.01)
H04N 5/232 (2006.01)
H04N 5/225 (2006.01)
H04M 1/00 (2006.01)

(52) U.S. Cl. ............... 348/374; 348/357; 455/556.1
(58) Field of Classification Search ......... 348/373–376, 348/340, 345, 357; 455/556.1, 556.2; 359/822–4; 396/145–6
See application file for complete search history.

(56) References Cited

U.S. PATENT DOCUMENTS

| | | | | |
|---|---|---|---|---|
| 4,576,460 | A * | 3/1986 | Daitoku et al. | 396/103 |
| 5,032,859 | A * | 7/1991 | Akimoto et al. | 396/132 |
| 5,032,919 | A * | 7/1991 | Randmae | 348/345 |
| 5,912,774 | A * | 6/1999 | Yoshida et al. | 359/823 |
| 5,969,889 | A * | 10/1999 | Iikawa et al. | 359/825 |
| 6,064,827 | A * | 5/2000 | Toyoda | 396/55 |
| 6,072,639 | A * | 6/2000 | Onda | 359/694 |
| 6,359,741 | B1 * | 3/2002 | Takatsuji et al. | 359/827 |
| 6,476,985 | B2 * | 11/2002 | Dou et al. | 359/823 |
| 7,068,443 | B1 * | 6/2006 | Hung et al. | 359/699 |

(Continued)

FOREIGN PATENT DOCUMENTS

GB 2422439 7/2006

(Continued)

OTHER PUBLICATIONS

Machine Translation of JP2006-038891 to Oki et al published Feb. 2006.*

(Continued)

*Primary Examiner*—Sinh Tran
*Assistant Examiner*—Daniel M Pasiewicz
(74) *Attorney, Agent, or Firm*—Renner, Otto, Boisselle & Sklar, LLP

(57) ABSTRACT

A camera assembly may include an autofocus assembly that selectively imparts a first displacement between a lens assembly and an imaging sensor and a second displacement between the lens assembly and the imaging sensor. The autofocus assembly includes at least one positioner and an actuator. The actuator is configured to move the positioner between a first position in which the positioner contacts a first surface that is in a first plane corresponding to the first displacement and second position in which the positioner contacts a second surface that is in a second plane corresponding to the second displacement. The first and second planes may be offset so that a distance between the first displacement and the second displacement directly corresponds to a distance between the first and second planes.

18 Claims, 3 Drawing Sheets

U.S. PATENT DOCUMENTS

| | | | |
|---|---|---|---|
| 7,127,162 B2 * | 10/2006 | Mano ........................ | 396/144 |
| 7,202,905 B2 * | 4/2007 | Castaneda et al. ........... | 348/373 |
| 7,210,629 B2 * | 5/2007 | Cho et al. ................... | 235/454 |
| 7,295,389 B2 * | 11/2007 | Ohtsuka et al. ............. | 359/819 |
| 7,430,368 B2 * | 9/2008 | Lee ............................. | 396/76 |
| 7,443,445 B2 * | 10/2008 | Kuchimaru ................. | 348/374 |
| 7,468,753 B2 * | 12/2008 | Butterworth et al. ........ | 348/357 |
| 7,567,754 B2 * | 7/2009 | Kinoshita .................... | 396/89 |
| 2004/0130808 A1 | 7/2004 | Yoneyama et al. | |
| 2004/0263999 A1 * | 12/2004 | Chan et al. .................. | 359/699 |
| 2005/0168846 A1 * | 8/2005 | Ye et al. ...................... | 359/819 |
| 2005/0220453 A1 * | 10/2005 | Mano ........................ | 396/529 |
| 2006/0044455 A1 * | 3/2006 | Kim et al. ................... | 348/360 |
| 2006/0098968 A1 | 5/2006 | Ito et al. | |
| 2006/0138873 A1 * | 6/2006 | Yasuda ........................ | 310/12 |
| 2006/0146170 A1 * | 7/2006 | Saito et al. .................. | 348/340 |
| 2006/0221469 A1 * | 10/2006 | Ye ............................... | 359/811 |
| 2007/0280668 A1 * | 12/2007 | Kubo et al. .................. | 396/133 |
| 2009/0034094 A1 * | 2/2009 | Noda et al. .................. | 359/694 |

FOREIGN PATENT DOCUMENTS

| | | | |
|---|---|---|---|
| JP | 2006038891 A | * | 2/2006 |
| JP | 2006227062 | | 8/2006 |

OTHER PUBLICATIONS

International Search Report and Written Opinion from corresponding International Application No. PCT/IB08/000280.

* cited by examiner

AUTOFOCUS ASSEMBLY THAT ADJUSTS A LENS IN THE OPTICAL AXIS DIRECTION BY ALIGNMENT OF HOLES IN A SPACING RING THAT RECEIVE BALL BEARINGS

TECHNICAL FIELD OF THE INVENTION

The technology of the present disclosure relates generally to an autofocus assembly for a camera and, more particularly, to a precision autofocus assembly that establishes two or more subject distance ranges for a camera.

DESCRIPTION OF THE RELATED ART

Mobile and/or wireless electronic devices are becoming increasingly popular. For example, mobile telephones, portable media players and portable gaming devices are now in wide-spread use. In addition, the features associated with certain types of electronic devices have become increasingly diverse. For example, many mobile telephones now include cameras.

Due to size and power constraints in a mobile telephone, many camera phones have used a fixed focus camera assembly. But as the resolution of the imaging sensor for these cameras increases (e.g., three to five megapixels or more), it becomes more difficult to achieve acceptable sharpness using a fixed focus arrangement. It has been proposed to add an autofocus system to camera phones to assist in taking sharp photographs at various subject distances, thereby leading to better image quality compared to a fixed focus camera. But adding an autofocus system may increase the cost of the camera system beyond the expectations of many users.

Also, autofocus systems rely on complex and sensitive component assemblies that are not generally practical for camera phones. For example, conventional autofocus systems rely on a mechanical activator that displaces a lens relative to an imaging sensor. The various types of activators that have been used include piezoelectric activators, electro-mechanical activators implemented with a voice coil acting against a magnet, and stepper motor actuators. Each of these types of activators has advantages and disadvantages. For instance, some actuators are more accurate and/or faster than others, but the better performing actuators are typically more expensive and are harder to control than less accurate and/or slower actuators. The less accurate and/or slower actuators tend to be more economical and easier to manufacture.

SUMMARY

To improve focusing of a camera assembly, the present disclosure describes an improved autofocus assembly. The autofocus assembly is particularly well suited for use with camera phones and other miniature cameras. Not only is the disclosed autofocus system cost effective, it achieves a high degree of performance without using a complicated assembly of components. In one embodiment, displacement of a lens assembly is changed by rotating a control member. Positioners (e.g., spherical bearings) may be disposed in through holes in the control member. When the control member is in a first position, the positioners may be received in corresponding receptacles (e.g., apertures or indents) of a displacement member that is located adjacent the control member. In the first position, the lens assembly may have a first optical displacement with respect to an imaging sensor. As the control member is rotated from the first position to a second position with respect to the displacement member, the balls may leave the apertures and ride on a surface of the displacement member. This has the effect of positioning the lens assembly at a second optical displacement with respect to the imaging sensor. The different optical displacements impart different subject distance ranges to the camera system such that actuation between the first and second positions results in changes to the focus of the camera assembly.

A high degree of precision in positioning of the lens assembly with respect to the imaging sensor may be achieved with very little electronic control and, in at least one embodiment, without the use of position sensors and/or a feedback system. In the above-described exemplary embodiment, a high degree of accuracy in the displacement of the lens assembly with respect to the imaging sensor may be readily achieved by controlling the physical thickness of the displacement member, which is a relatively simple task. At the same time, the amount of rotation of the control member need not be precisely controlled since over-rotation of the control member will have little or no impact on the amount of displacement of the lens assembly. Therefore, in the exemplary embodiment, a relatively unsophisticated actuator to effectuate rotation of the control member may be employed. In one embodiment, the actuator may be a shape memory allow (SMA), such as a "muscle wire." Also, at the time of manufacturing of the camera assembly, little or no calibration and/or adjustment of the autofocus components may be required. In addition, a relatively simple controller may be employed to control the focus of the camera assembly. Furthermore, the autofocus assembly may be bi-stable (e.g., may not move from the first position to the second position or vice versa without actuation) and, therefore, will consume very little or no power between position changes.

According to one aspect of the disclosure, a camera assembly includes an imaging sensor; a lens assembly; and an autofocus assembly that selectively imparts a first displacement between the lens assembly and the imaging sensor and a second displacement between the lens assembly and the imaging sensor, wherein the autofocus assembly includes at least one positioner and an actuator, the actuator configured to move the positioner between a first position in which the positioner contacts a first surface that is in a first plane corresponding to the first displacement and second position in which the positioner contacts a second surface that is in a second plane corresponding to the second displacement, the first and second planes being offset so that a distance between the first displacement and the second displacement directly corresponds to a distance between the first and second planes.

According to one embodiment of the camera assembly, the actuator applies force to a control member that moves the positioner between the first and second positions.

According to one embodiment of the camera assembly, the control member traps the positioner in a receptacle of the control member.

According to one embodiment of the camera assembly, the receptacle of the control member is a through hole.

According to one embodiment of the camera assembly, the first surface is a surface of a displacement member that includes a receptacle into which the positioner is received so that the positioner contacts the second surface.

According to one embodiment of the camera assembly, the receptacle of the displacement member is a through hole.

According to one embodiment of the camera assembly, the second surface is a surface of a camera module housing located adjacent the displacement member, and the camera module housing retains the autofocus assembly and the lens assembly.

According to one embodiment of the camera assembly, the positioner is spherical.

According to one embodiment of the camera assembly, a thickness of the displacement defines the distance between the first displacement and the second displacement.

According to one embodiment of the camera assembly, the positioner further contacts a contact surface of the lens assembly to force the lens assembly between the first and second displacements.

According to one embodiment of the camera assembly, force is applied to the lens assembly to maintain contact between the lens assembly and the positioner.

According to one embodiment of the camera assembly, the force is applied by one or more springs.

According to one embodiment of the camera assembly, the second surface is part of a member other than the displacement member.

According to one embodiment of the camera assembly, force is applied to the lens assembly to maintain contact between the positioner and the first surface when the positioner is in the first position and between the positioner and the second surface when the positioner is in the second position.

According to one embodiment of the camera assembly, the actuator includes a shape memory alloy (SMA) member attached to the control member such that contraction of the SMA member achieves the movement of the control member to move the positioner from the first position to the second position.

According to one embodiment of the camera assembly, the actuator applies counter-force to the control member to return the positioner from the second position to the first position.

According to one embodiment of the camera assembly, the force and the counter-force are applied by contracting different portions of the same SMA member.

According to one embodiment of the camera assembly, the camera assembly is part of a mobile telephone.

These and further features will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the scope of the claims appended hereto.

Features that are described and/or illustrated with respect to one embodiment may be used in the same way or in a similar way in one or more other embodiments and/or in combination with or instead of the features of the other embodiments.

The terms "comprises" and "comprising," when used in this specification, are taken to specify the presence of stated features, integers, steps or components but do not preclude the presence or addition of one or more other features, integers, steps, components or groups thereof.

DETAILED DESCRIPTION OF EMBODIMENTS

Figure 1:
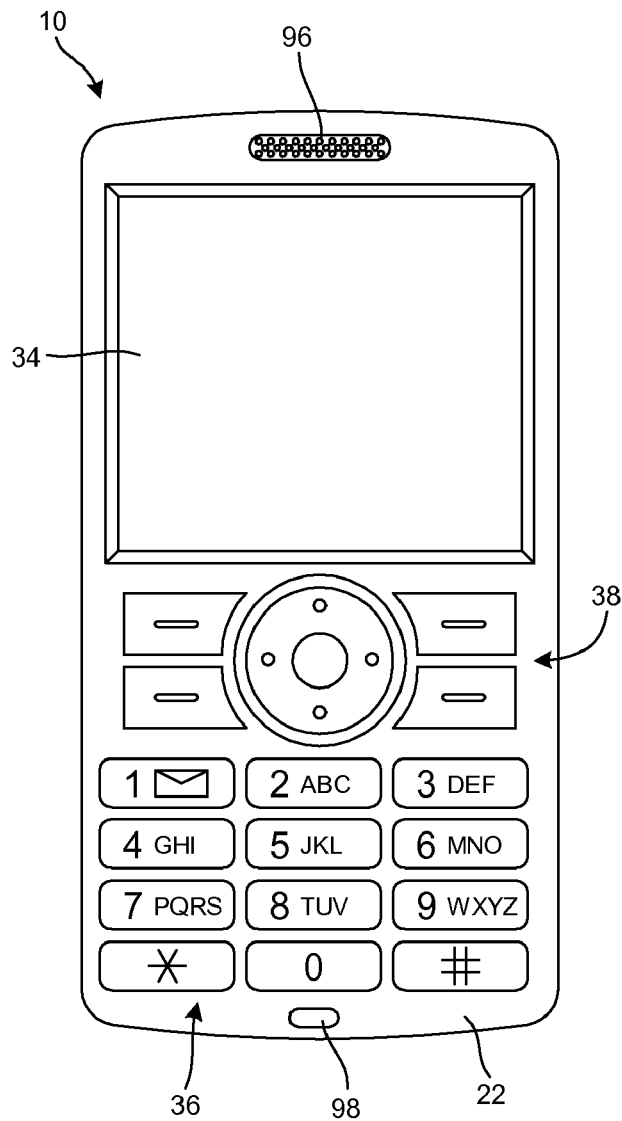
FIGS. 1 and 2 are respectively a front view and a rear view of an exemplary electronic device that includes a camera assembly having an autofocus assembly.

Embodiments will now be described with reference to the drawings, wherein like reference numerals are used to refer to like elements throughout. It will be understood that the figures are not necessarily to scale.

Described below in conjunction with the appended figures are various embodiments of an improved autofocus assembly. In the illustrated embodiments, the autofocus assembly has two positions that correspond to two subject distance ranges, but other embodiments of the autofocus assembly may have more than two subject distance ranges. The disclosed autofocus assembly differs from many conventional high performance autofocus assemblies that typically position a lens among twenty to thirty discrete positions. While the conventional high performance autofocus assemblies may facilitate taking sharp pictures at subject distances from about ten centimeters to infinity, the disclosed approach may assist in taking photographs that are acceptable to most camera phone users.

A fixed focus solution, on the other hand, has a fixed subject distance. In a fixed focus system, the camera relies on a depth of field of the lens to obtain a fairly large subject distance range. The exact range for a particular fixed focus camera will depend on the lens focal length, the aperture, the pixel count and the optical format of the imaging sensor. As the pixel count of the sensor increases, the depth of field becomes shallower (assuming the other parameters stay the same).

A fixed focus camera is usually focused at its hyperfocal distance ($L_H$), meaning that an acceptable image may be captured at subject distances from a near distance ($L_{NEAR}$) of about half the hyperfocal distance ($L_H$ divided by 2) to a far distance ($L_{FAR}$) equaling infinity. The hyperfocal distance may be calculated using equation 1 where f is the focal length of the lens assembly, N is the aperture (F-number) and C is the blur circle (largest permissible circle for a light bundle incident on the imaging sensor, also known as the largest permissible circle of confusion).

$$\text{Hyperfocal Distance } L_H = \frac{f^2}{NC} \qquad \text{Eq. 1}$$

As an example, a camera may have an imaging sensor with three million pixels and a pixel pitch of 1.75 microns, and a lens with a focal length of 3.7 millimeters to achieve a horizontal field of view of about fifty two degrees. If the blur circle is double the pixel pitch, the blur circle for the camera would be about 3.5 microns. Solving equation 1 would determine that the hyperfocal distance is about 1.4 meters. Therefore, the near focus distance ($L_{NEAR}$) of this exemplary camera would be about seventy centimeters.

If the user is interested in taking pictures of objects closer than seventy centimeters, blurry photographs would likely result. The autofocus solution described herein lowers the available near distance. In one embodiment, the disclosed autofocus solution adds a second focus setting. Following the foregoing example for the three megapixel camera, the first focus setting may be about 1.4 meters to provide a first subject range of about seventy centimeters to infinity. The second focus setting may be set to about forty seven centimeters, or about one third of the exemplary hyperfocal distance. In the second setting, the near distance would be about thirty five centimeters, or about one quarter the hyperfocal distance, and the far distance would be about seventy centimeters. Therefore, by switching between the first setting and the second setting in accordance with the proximity of an object to be photographed with the camera, an effective focus range of about thirty five centimeters to infinity may be established with just the two lens positions. In the example, the displacement of the lens assembly between the first focus setting and the second focus setting is about twenty microns.

The autofocus assembly will be primarily described in the context of positioning a lens assembly for a digital camera (e.g., a digital still camera and/or a digital video camera) for a mobile telephone. It will be appreciated that the autofocus assembly may be used in other operational contexts such as, but not limited to, a dedicated camera, another type of electronic device that has a camera (e.g., a personal digital assistant (PDA), a media player, a gaming device, a "web" camera, a computer, etc.), a projector, and so forth. It is further noted that the interchangeable terms "electronic equipment" and "electronic device" include portable radio communication equipment. The term "portable radio communication equipment," which hereinafter is referred to as a "mobile radio terminal," includes all equipment such as mobile telephones, pagers, communicators, electronic organizers, PDAs, smartphones, portable communication apparatus or the like.

Figure 2:
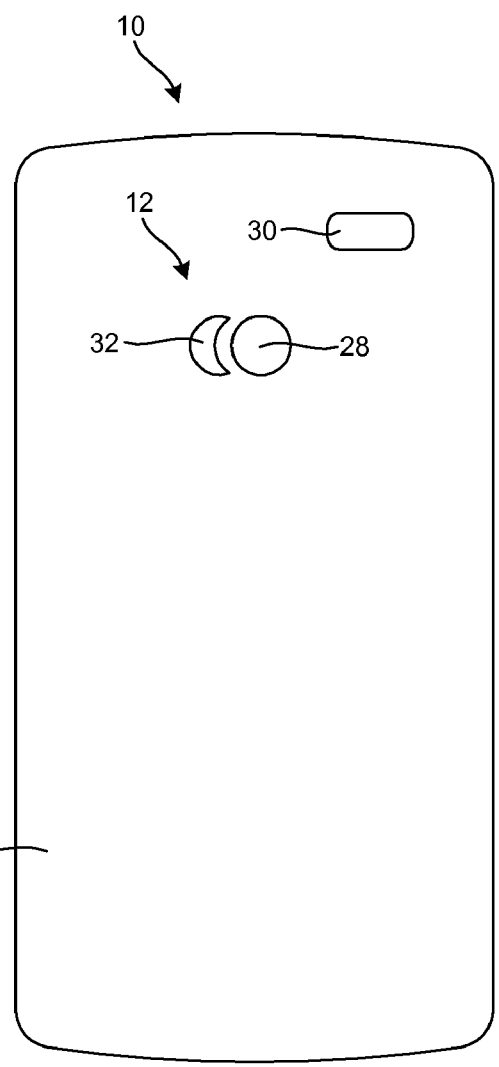

Referring initially to FIGS. 1 and 2, an electronic device 10 is shown. The illustrated electronic device 10 is a mobile telephone. The electronic device 10 includes a camera assembly 12 for taking digital still pictures and/or digital video clips. Therefore, it is highlighted that the electronic device 10 need not be a mobile telephone, but could be a dedicated camera or some other device as indicated above.

Figure 3:
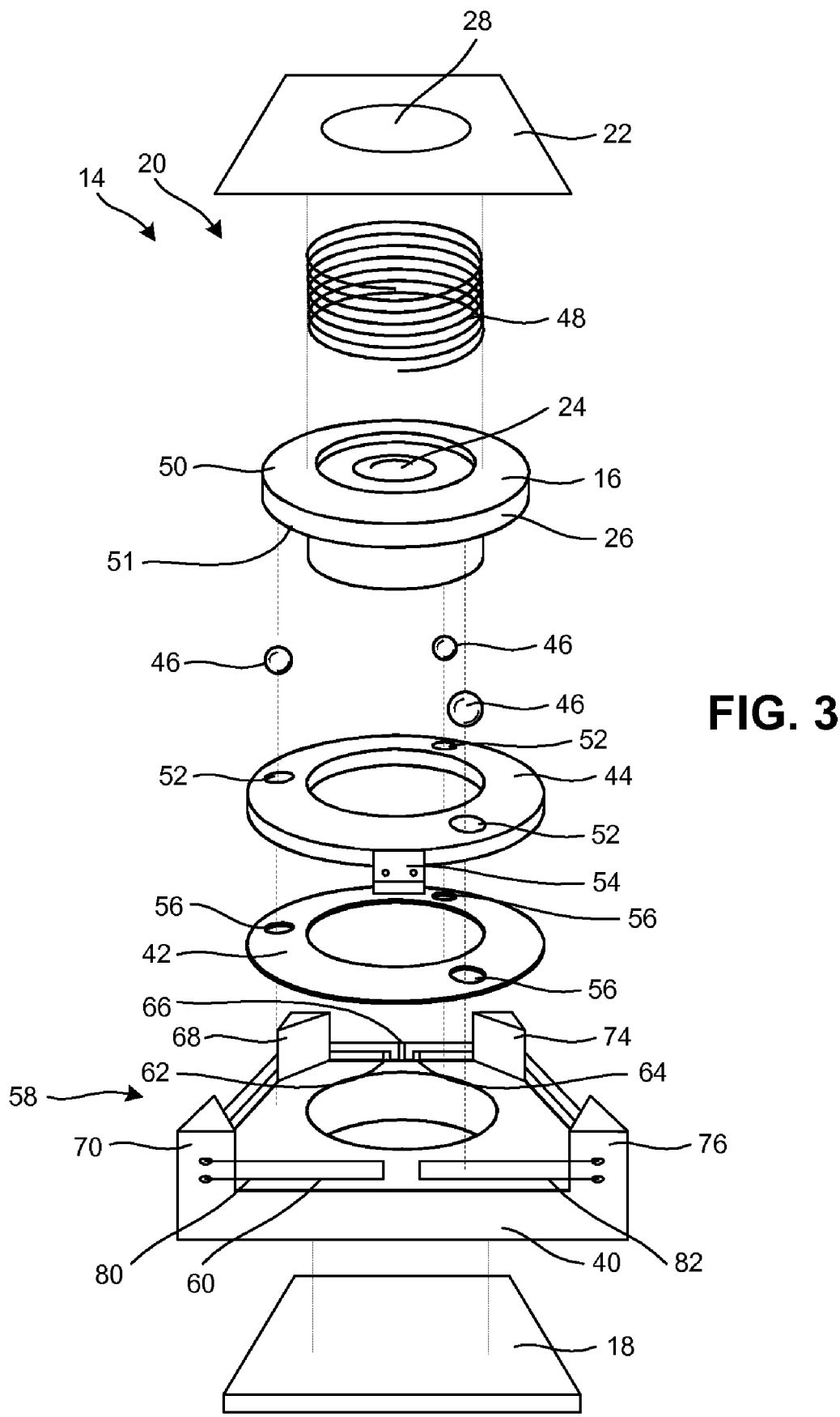
FIG. 3 is an exploded view of an exemplary autofocus assembly for the camera assembly.

With additional reference to FIG. 3, the electronic device 10 may include an autofocus assembly 14. In the illustrated embodiment, the autofocus assembly 14 moves a lens assembly 16 between a first position and a second position. In the first position, the lens assembly 16 has a first displacement with respect to an imaging sensor 18 and, in the second position, the lens assembly 16 has a second displacement with respect to the imaging sensor 18. The first and second positions respectively impart a first focus range and a second focus range to the camera assembly 12.

The autofocus assembly 14, the lens assembly 16 and the imaging sensor 18 may be collectively assembled to form a camera module 20 that may be mounted within a housing 22 of the electronic device 10. The lens assembly 16 may include one or more lenses 24 that are retained by a lens retainer 26. The imaging sensor 18 captures images of a scene contained within a field of view of the camera assembly 12 while the lens assembly 16 focuses light from the field of view onto the imaging sensor 18. A window 28 may be present over an opening in the housing 22 to serve as a protective cover for the camera module 20. The window 28 may also function as a lens and/or a filter. In another embodiment, the window 28 may be omitted or formed as part of the lens assembly 16. The camera module 20 may include other optical components, such as filters, prisms, mirrors, optical zooming mechanics, a lens or lenses that remain stationary relative to the imaging sensor 18, etc.

It will be appreciated that the camera assembly 12 may include additional components that may form part of the camera module 20 or that may be retained by the electronic device 10 separately from the camera module 20. For instance, the camera assembly 12 may include an electronic controller (not illustrated) that controls operation of the camera module 20 and other camera assembly 12 operations.

Other components of the camera assembly 12 include, for example, a flash 30, a light meter 32, a display 34 for functioning as an electronic viewfinder and as part of an interactive user interface, a keypad 36 and/or buttons 38 for accepting user inputs, an optical viewfinder (not shown), and any other components commonly associated with cameras.

Figure 4:
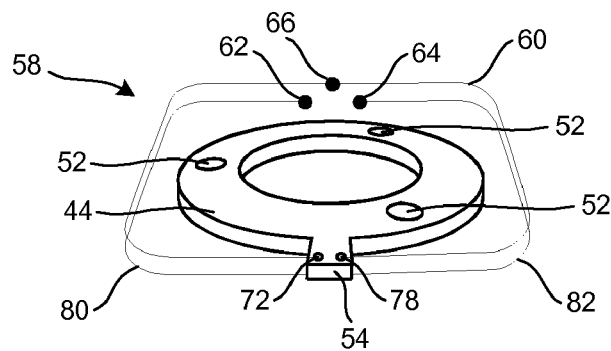
FIG. 4 is a perspective view of an assembled control member and an actuator member for the autofocus assembly of FIG. 3.

Referring now to FIGS. 3 and 4, details of the illustrated embodiment of the autofocus assembly 14 will be described. The autofocus assembly 14 of the illustrated embodiment is configured to impart movement of the lens assembly 16. It will be appreciated that the operative principles of the autofocus assembly 14 instead may be applied to impart movement to the imaging sensor 18, or both the imaging sensor 18 and the lens assembly 16.

The autofocus assembly 14 may include a stack of components, including a platform 40, a displacement member 42, a control member 44, a plurality of positioners 46, and a spring 48. The lens assembly 16 may be located between the spring 48 and the control member 44. The platform 40 may form part of a housing for the camera module 20.

Using directional and relational terms that correspond to the illustrated vertical arrangement of components, the interaction of the components will be described. It will be appreciated that different directional and relational terms may be used depending on the orientation of the components, changes in the order of components, and/or the addition and/or subtraction of components.

As illustrated, many of the components may include a central through hole to create an optical pathway for light to travel from an opening in the housing 22 (which may be covered by the window 28), through the lens assembly 16 and onto an operative portion of the imaging sensor 18.

An upper end of the spring 48 may contact a lower surface of the housing 22. In other embodiments, the upper end of the spring 48 may contact another surface, such as a dedicated housing member (not illustrated) for the camera module 20. A lower end of the spring 48 may contact an upper surface of the lens retainer 26. The lens retainer 26 may have a stepped radius along the longitudinal axis of the lens retainer. The stepped radius may be arranged such that the upper portion of the lens retainer 26 includes a flange 50 that has a lower surface that serves as a contact surface 51 for the positioners 46. The lower portion of the lens retainer 26 may fit in the central through hole of one or more of the control member 44, the displacement member 42 and the platform 40. Also, while the flange 50, the control member 44 and the displacement member 42 are shown and described as being annular in nature (e.g., round), these components may have other geometries. Also, other structures that are shown and/or described as being circular and/or spherical may have other geometries.

When the autofocus assembly 14 is assembled, each positioner 46 may fit within a receptacle of the control member 44 so that the positioners 46 are laterally trapped by the control member 44. In the illustrated embodiment, each positioner 46 fits within a corresponding through hole 52 of the control member 44 such that the control member 44 surrounds a vertically central portion of the positions 46. In this manner, the positioners 46 are laterally trapped by the control member 44 and rotation of the control member 44 causes corresponding circumferential movement of the positioners 46 about a longitudinal axis of the autofocus assembly 14. The upper portion of the positioners 46 may contact the contact surface 51 of the flange 50. The control member 44 may include a radially projecting lever 54. Applying circumferentially directed force to the lever 54 may result in rotation of the control member 44 and corresponding movement of the positioners 46.

The positioners 46 of the illustrated embodiment are spheres. For instance, the positioners 46 may be ball bearings. In another embodiment, the positioners 46 may be located in and trapped by recesses in a lower surface of the control member 44. Alternatively, the positioners 46 may be bumps or detents that are formed on or integral with a lower surface of the control member 44. In these embodiments the positioners 46 do not contact the contact surface 51. Instead, an upper surface of the control member 44 may contact the contract surface 51. Also, even when the positioners 46 extend through an upper surface of the control member 44, the upper surface of the control member 44 may contact the contact surface 51 in one or both of the positions of the autofocus assembly 14.

The control member 44 may rest over (and possibly contact) the displacement member 42, which may have receptacles in which lower portions of the positioners 46 may be received when the receptacles (e.g., holes 52) of the control member are vertically aligned with the receptacles of the displacement member 42. In the illustrated embodiment, the receptacles of the displacement member 42 are through holes 56. In this embodiment, when the autofocus assembly 14 is in the second position so that the displacement of the lens assembly 16 is closer to the imaging sensor 18 relative to the first position, the through holes 52 of the control member 44 and the through holes 56 of the displacement member 42 may be vertically aligned. In this position, the lower portions of the positioners 46 may contact an upper surface of the platform 40. Therefore, the distance between the upper surface of the platform 40 and contact surface 51 will be about the diameter of the positioners 46.

Application of circumferentially directed force on the lever 54 may urge the control member 44 in a corresponding rotational direction. Under this force, the positioners 46 may ride up and out of the through holes 56, and onto the upper surface of the displacement member 42 to achieve the first position of the autofocus assembly 14. Also, the lens assembly 16 will be forced upward against the spring 48, which may compress in reaction to the upward force. In this position, the distance between the upper surface upper surface of the platform 40 and contact surface 51 will be about the diameter of the positioners 46 plus the thickness of the displacement member 42. The autofocus assembly 14 may be moved from the first position back to the second position by applying force to the lever 54 to urge the control member 44 in a direction to achieve alignment of the through holes 52 and the through holes 56. While the illustrated spring 48 is shown as a coil spring, one or more leaf springs or other resilient members may be positioned to apply downward pressure on the lens assembly 16. Also, one or more coil springs may be positioned between the platform 40 and the lens assembly 16 to pull the lens assembly 16 downward.

It will be appreciated that the difference in the displacement of the lens assembly 16 with respect to the imaging sensor 18 will change by the thickness of the displacement member 42 when the autofocus assembly 14 moves between the first and second positions. The thickness of the displacement member 42 and the thickness of the positioners 46 may be controlled so that when the autofocus assembly 14 is in the first position, objects in a first focus range of the camera assembly 12 may be satisfactorily imaged. As indicated above, the first focus range may be about half the hyperfocal distance to infinity. Also, the thickness of the displacement member 42 and the positioners 46 may be controlled so that when the autofocus assembly 14 is in the second position, the second focus range may be about a quarter of the hyperfocal distance to about half of the hyperfocal distance. It will be appreciated that other thicknesses can be used to achieve other focus ranges. Following the above-described example of the three megapixel camera, the thickness of the displacement member 42 may be about twenty microns to achieve a first focus range of about seventy centimeters to infinity and a second focus range of about thirty five centimeters to about seventy centimeters.

To assist in accurately controlling the displacement of the lens assembly 16, the applicable upper and lower surfaces of the lens assembly 16, the control member 44, the displacement member 42 and the platform 40 may be in generally parallel planes.

In another embodiment, the displacement member 42 may be omitted and recesses with controlled depths may be formed in the upper surface of the platform 40 to receive the positioners 46 when the autofocus assembly 14 is in the second position. In another embodiment, the platform may have raised steps (e.g., rectangular blocks). The positioners 46 may rest on the platform 40 in areas between the steps when the autofocus assembly 14 is in the second position and the positioners 46 may rest on the steps when the control member 44 is rotated so that the autofocus assembly 14 is in the first position. In these embodiments, the platform 40 may be considered a displacement member.

In another embodiment, the control member 44 may be omitted in favor of pockets that trap the positioners 46 in the contact surface 51 of the lens assembly 16. In this embodiment, displacement of the lens assembly 16 may be achieved by rotation of the lens assembly 16 or the displacement member 42. Also, in this embodiment, the lens retainer 26 may be considered a control member.

In still another embodiment, the control member 44 may be omitted in favor of positioners 46 that are formed as part of the lens retainer 26. For instance, the positioners 46 may take the form of detents that are formed on the under side of the flange 50. The detents may be, for example, polygons with beveled or rounded corners. Also, the displacement member 42 may be omitted in favor of receptacles formed in the platform 40. The receptacles may have a cross-sectional profile the approximates a cross-sectional profile of the positioners 46. For instance, the receptacles may be indents that have bottom surfaces that contact bottom surfaces of the positioners 46 when the autofocus assembly 14 is in the second position. When the autofocus assembly 14 is moved to the first position, the detents may slide out of the indents so that the bottom surfaces of the detents rest on the upper surface of the platform 40. In this manner, the vertical distance between the bottom of the indents and the surface of the platform 40 may control the displacement of the lens assembly 16. To facilitate movement from the second position to the first position and vice versa, the edges of the detents and the sidewalls of the indents may be made at corresponding angles (e.g., the sidewalls of the indents may be angled to act as a ramp for the detents). In this embodiment, the platform 40 may be considered a displacement member and the lens retainer 26 may be considered a control member. In a similar embodiment, the detents may be placed on the platform 40 and the indents may be formed in the lens retainer 26.

In still another embodiment, a spacer member may be positioned between the displacement member 42 and the platform 40 and/or a spacer member may be positioned between the upper portion of the positioners 46 and the contact surface 51. The spacer member(s) may be used to assist in establishing a desired optical displacement between the lens assembly 16 and the imaging sensor 18. Even with the presence of a spacer member(s), the optical displacement between the lens assembly 16 and the imaging sensor 18 may be controlled by the thickness of the displacement member 42.

In yet another embodiment, the components may be placed in a different order. For instance, the spring 48 may be positioned under the contact surface 51 and the control member 44, the displacement member 42 and the positioners 46 may be located above the lens assembly 16.

In another embodiment, the autofocus assembly 14 may have more than two positions. For instance, the displacement member 42 may not have an upper surface and a lower surface that are in parallel planes. Rather, the upper surface of the displacement member 42 may be stepped, sloped, beveled, have cam surfaces, have recesses of varying depths, etc. Rotation of the control member 44 may be controlled to bring the positioner 46 into alignment with various points of the displacement member 42 so as to effectuate a corresponding number of displacements of the lens assembly 16.

The general operation of the autofocus assembly 14 for the illustrated embodiment may be summarized as follows. When the components are aligned so that the positioners 46 pass through the through holes 52 in the control member 44 and the through holes 56 the displacement member 42, the spring 48 pushes the lens assembly 16 to establish contact between the lens assembly 16 and the positioners 46 and to establish contact between the positioners 46 and the platform 40. As the control member 44 is rotated, the positioners 46 are forced to leave the through holes 56 in the displacement member 42 and climb upward and on to the upper surface of the displacement member 42. In the rotated configuration, the spring 48 pushes the lens assembly 16 downward to establish contact between the lens assembly 16 and the positioners 46 and to establish contact between the positioners 46 and the displacement member 42. The upward travel of the positioners 46 also results in upward movement of the lens assembly 16. In this manner, the distance between the lens assembly 16 and the platform 40 is elevated an amount equal to (or a function of) the thickness of the displacement member 42. Thus, the displacement of the lens assembly 16 with respect to the imaging sensor 18 also is changed an amount commensurate with the thickness of the displacement member 42. Rotation of the control member 44 to re-establish alignment of the through holes 52 and 56 allows the positioners 46 to leave the surface of the displacement member 42 and, under the force of the spring 48, move into the holes 56. In this manner, the positioners 46 and the lens assembly 16 move optically closer to the imaging sensor 18 a distance that is commensurate with the thickness of the displacement member 42.

As will be appreciated, the autofocus assembly 14 provides very accurate displacement of the lens assembly 16 that is not dependent on the accuracy of the amount of rotation of the control member 44. So long as the control member 44 is rotated a threshold amount, displacement of the lens assembly 16 may be achieved. The threshold amount may be, for example, at least the radius of the positioners 46, but is preferably a little more. An appropriate range for the threshold amount in an exemplary embodiment may be about three quarters of the diameter of the positioners 46 to about twice the diameter of the positioners 46.

The control member 44 may be rotated by an actuator 58. As indicated, the precision of actuator 58 need not be high to achieve a high degree of precision in the displacement of the lens assembly 16. Exemplary actuators 58 may include one or more motors, one or more electromagnetic actuators, and one or more piezoelectric actuators.

As shown in the illustrated embodiment, the actuator 58 may include a member 60 that is made from a shape memory alloy (SMA). In the illustrated embodiment, the member 60 is a wire SMA member, which is commonly known as a "muscle wire." Wire SMA members exhibit the property of shrinking in length when heated to a suitable temperature, which is typically about eighty degrees Celsius to about ninety degrees Celsius. For instance, many SMA wires will contract in length about three percent to about eight percent when heated to a temperature of about ninety degrees Celsius. Heating of the wire may be achieved by passing a current through the wire to create resistive heating. When the wire cools by a few degrees it may soften and may be expanded to its original length by applying a relatively weak mechanical force. Suitable wire SMA members are sold by Nitinol Devices and Components of Fremont, Calif., USA, and under the designation FLEXINOL by Dynalloy, Inc. of Costa Mesa, Calif., USA, as well as other manufacturers and vendors.

With continued reference to FIGS. 3 and 4, FIG. 3 shows the member 60 assembled with retaining components of the camera module 20 and FIG. 4 shows the member 60 assembled with the control member 44. When the camera assembly 12 is fully assembled, the member 60 will be assembled with both the retaining components of the camera module 20 and the control member 44.

The member 60 may have a first end that is mechanically secured and electrically connected to a first electrical terminal 62 (shown schematically in FIG. 4 as a node). A second end of the member 60 may be mechanically secured and electrically connected to a second electrical terminal 64 (shown schematically in FIG. 4 as a node). A point of the member 60 between the first and second ends of the member 60 may be in at least electrical connection with a third terminal 66. In the illustrated embodiment, the member 60 is mechanically and electrically connected to the third terminal 66 at about a midpoint between the first and second ends. In an alternative embodiment, a first SMA member may be connected between the first terminal 62 and the third terminal 66 and a second SMA member may be connected between the second terminal 64 and the third terminal 66 (or a fourth terminal).

Connected to the platform 40 or integrally formed with the platform 40 may be posts that are used to support and guide the member 60. The posts may be non-conductive so as not to interfere with current that is passed through the member 60. In one embodiment, the posts may be replaced by sidewalls of a housing for the camera module 20.

In the illustrated embodiment, the terminals 62, 64 and 66 are centrally mounted to the platform 40 along a rear edge of the platform 40. Proceeding from the first terminal, the member 60 may be threaded through a first post 68 that is located at the rear, left-hand corner of the platform 40 and then through a second post 70 that is located at the front, left-hand corner of the platform 40. Then, the member 60 is threaded vertically through a first hole 72 in the lever 54 and returns to the third terminal 66 through the second post 70 and the first post 68. Proceeding from the third terminal 66, the member 60 may be threaded through a third post 74 that is located at the rear, right-hand corner of the platform 40 and then through a fourth post 76 that is located at the front, right-hand corner of the platform 40. Then, the member 60 is threaded vertically through a second hole 78 in the lever 54 and returns to the second terminal 64 through the fourth post 76 and the third post 74.

The third terminal 66 may function as a common ground for a first portion 80 of the member 60 that is connected between the first terminal 62 and the third terminal 66 and for a second portion 82 of the member 60 that is connected between the second terminal 64 and the third terminal 66. When a control signal is applied to the first portion 80 (e.g., by passing current between the first terminal 62 and the third terminal 66 and through the first portion 80), the control member 44 may be rotated in a clockwise direction by contraction of the first portion 80 of the member 60. Similarly, when a control signal is applied to the second portion 82 (e.g., by passing current between the second terminal 64 and the third terminal 66 and through the second portion 82), the control member 44 may be rotated in a counter-clockwise direction by contraction of the second portion 82 of the member 60. In one embodiment, the control member 44 may be rotated clockwise to dislodge the positioners 46 from the holes 56 in the displacement member 42 and may be rotated counter-clockwise to return the positioners 46 to the holes 56. In another embodiment, the control member 44 may be rotated counter-clockwise to dislodge the positioners 46 from the holes 56 in the displacement member 42 and may be rotated clockwise to return the positioners 46 to the holes 56. Directing the member 60 around the perimeter of the control member 44 may provide enough length to the member 60 so that the member 60 may be contracted enough to result in sufficient rotational movement of the control member 44.

In one embodiment, the coil spring 48 of the illustrated embodiment may be replaced by clips, leaf springs, resilient members or elastic members that are retained by the posts. For instance, a first resilient strap may be retained by two adjacent posts (e.g., posts 68 and 70) and a second resilient strap may be retained by another pair of adjacent posts (e.g., posts 74 and 76). The straps may engage an upper surface of the lens retainer 26 to apply downward pressure to the lens assembly 16. In another embodiment, downward force on the lens assembly may be indirectly exerted on the lens assembly 16. For instance, force may be exerted on a supplemental ring that, in turn, acts upon the lens assembly 16.

As indicated, the illustrated electronic device 10 shown in FIGS. 1 and 2 is a mobile telephone. Features of the electronic device 10, when implemented as a mobile telephone, will be described with additional reference to FIG. 5. The electronic device 10 is shown as having a "brick" or "block" form factor housing, but it will be appreciated that other housing types may be utilized, such as a "flip-open" form factor (e.g., a "clamshell" housing) or a slide-type form factor (e.g., a "slider" housing).

As indicated, the electronic device 10 may include the display 34. The display 34 displays information to a user such as operating state, time, telephone numbers, contact information, various menus, etc., that enable the user to utilize the various features of the electronic device 10. The display 34 also may be used to visually display content received by the electronic device 10 and/or retrieved from a memory 84 (FIG. 5) of the electronic device 10. The display 34 may be used to present images, video and other graphics to the user, such as photographs, mobile television content and video associated with games.

The keypad 36 and/or buttons 38 may provide for a variety of user input operations. For example, the keypad 36 may include alphanumeric keys for allowing entry of alphanumeric information such as telephone numbers, phone lists, contact information, notes, text, etc. In addition, the keypad 36 and/or buttons 38 may include special function keys such as a "call send" key for initiating or answering a call, and a "call end" key for ending or "hanging up" a call. Special function keys also may include menu navigation and select keys to facilitate navigating through a menu displayed on the display 34. For instance, a pointing device and/or navigation keys may be present to accept directional inputs from a user. Special function keys may include audiovisual content playback keys to start, stop and pause playback, skip or repeat tracks, and so forth. Other keys associated with the mobile telephone may include a volume key, an audio mute key, an on/off power key, a web browser launch key, a camera key, etc. Keys or key-like functionality also may be embodied as a touch screen associated with the display 34. Also, the display 34 and keypad 36 and/or buttons 38 may be used in conjunction with one another to implement soft key functionality.

The electronic device 10 may include call circuitry that enables the electronic device 10 to establish a call and/or exchange signals with a called/calling device, which typically may be another mobile telephone or landline telephone. However, the called/calling device need not be another telephone, but may be some other device such as an Internet web server, content providing server, etc. Calls may take any suitable form. For example, the call could be a conventional call that is established over a cellular circuit-switched network or a voice over Internet Protocol (VoIP) call that is established over a packet-switched capability of a cellular network or over an alternative packet-switched network, such as WiFi (e.g., a network based on the IEEE 802.11 standard), WiMax (e.g., a network based on the IEEE 802.16 standard), etc. Another example includes a video enabled call that is established over a cellular or alternative network.

The electronic device 10 may be configured to transmit, receive and/or process data, such as text messages, instant messages, electronic mail messages, multimedia messages, image files, video files, audio files, ring tones, streaming audio, streaming video, data feeds (including podcasts and really simple syndication (RSS) data feeds), and so forth. It is noted that a text message is commonly referred to by some as "an SMS," which stands for simple message service. SMS is a typical standard for exchanging text messages. Similarly, a multimedia message is commonly referred to by some as "an MMS," which stands for multimedia message service. MMS is a typical standard for exchanging multimedia messages. Processing data may include storing the data in the memory 84, executing applications to allow user interaction with the data, displaying video and/or image content associated with the data, outputting audio sounds associated with the data, and so forth.

The electronic device 10 may include a primary control circuit 86 that is configured to carry out overall control of the functions and operations of the electronic device 10. The control circuit 86 may be responsible for controlling actuation of the autofocus assembly 14. Alternatively, control of the autofocus assembly 14 may be handled by a separate controller (not shown) of the camera assembly 12. The control circuit 86 may include a processing device 88, such as a central processing unit (CPU), microcontroller or microprocessor. The processing device 88 executes code stored in a memory (not shown) within the control circuit 86 and/or in a separate memory, such as the memory 84, in order to carry out operation of the electronic device 10.

Among other data storage responsibilities, the memory 84 may be used to store images captured by the camera assembly 12. Alternatively, the images may be stored in a separate memory. The memory 84 may be, for example, one or more of a buffer, a flash memory, a hard drive, a removable media, a volatile memory, a non-volatile memory, a random access memory (RAM), or other suitable device. In a typical arrangement, the memory 84 may include a non-volatile memory (e.g., a NAND or NOR architecture flash memory) for long term data storage and a volatile memory that functions as system memory for the control circuit 86. The volatile memory may be a RAM implemented with synchronous dynamic random access memory (SDRAM), for example. The memory 84 may exchange data with the control circuit 86 over a data bus. Accompanying control lines and an address bus between the memory 84 and the control circuit 86 also may be present.

The processing device 88 may execute code that implements the various functions of the electronic device 10. It will be apparent to a person having ordinary skill in the art of computer programming, and specifically in application programming for mobile telephones or other electronic devices, how to program a electronic device 10 to operate and carry out various logical functions.

Figure 5:
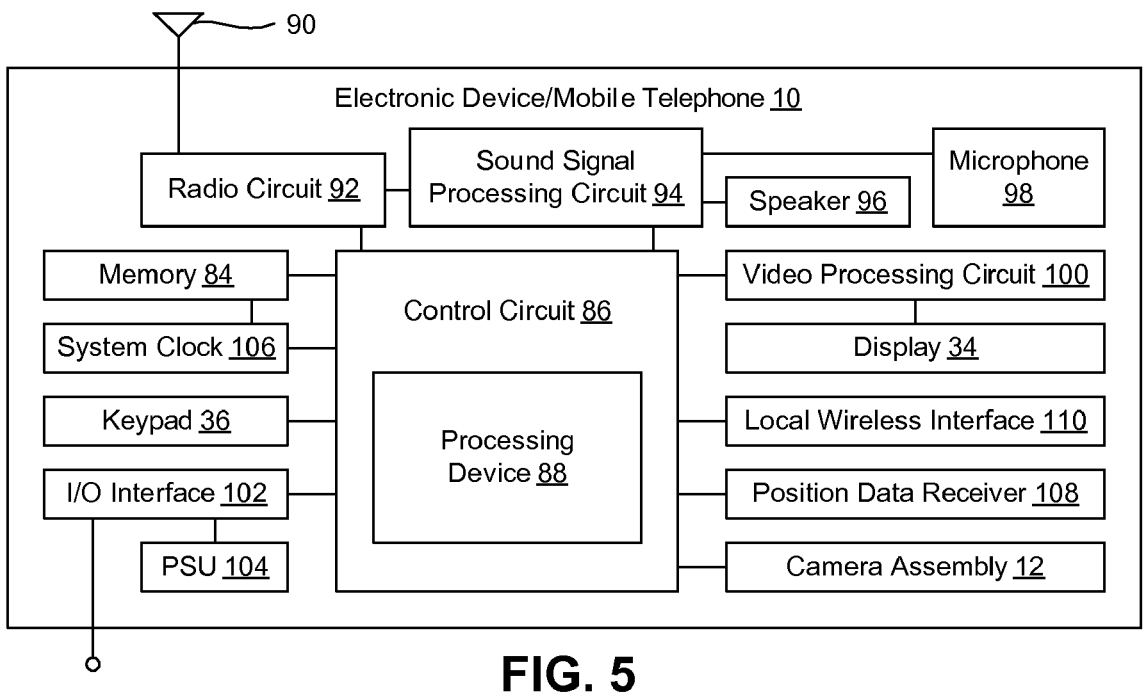
FIG. 5 is a schematic block diagram of the electronic device of FIGS. 1 and 2.

Continuing to refer to FIGS. 1, 2, and 5, the electronic device 10 includes an antenna 90 coupled to a radio circuit 92. The radio circuit 92 includes a radio frequency transmitter and receiver for transmitting and receiving signals via the antenna 90. The radio circuit 92 may be configured to operate in a mobile communications system and may be used to send and receive data and/or audiovisual content. Receiver types for interaction with a mobile radio network and/or broadcasting network include, but are not limited to, global system for mobile communications (GSM), code division multiple access (CDMA), wideband CDMA (WCDMA), general packet radio service (GPRS), WiFi, WiMax, digital video broadcasting-handheld (DVB-H), integrated services digital broadcasting (ISDB), etc., as well as advanced versions of these standards. It will be appreciated that the antenna 90 and the radio circuit 92 may represent one or more than one radio transceivers.

The electronic device 10 further includes a sound signal processing circuit 94 for processing audio signals transmitted by and received from the radio circuit 92. Coupled to the sound processing circuit 94 are a speaker 96 and a microphone 98 that enable a user to listen and speak via the electronic device 10 as is conventional. The radio circuit 92 and sound processing circuit 94 are each coupled to the control circuit 86 so as to carry out overall operation. Audio data may be passed from the control circuit 86 to the sound signal processing circuit 94 for playback to the user. The audio data may include, for example, audio data from an audio file stored by the memory 84 and retrieved by the control circuit 86, or received audio data such as in the form of streaming audio data from a mobile radio service. The sound processing circuit 94 may include any appropriate buffers, decoders, amplifiers and so forth.

The display 34 may be coupled to the control circuit 86 by a video processing circuit 100 that converts video data to a video signal used to drive the display 34. The video processing circuit 100 may include any appropriate buffers, decoders, video data processors and so forth. The video data may be generated by the control circuit 86, retrieved from a video file that is stored in the memory 84, derived from an incoming video data stream that is received by the radio circuit 92 or obtained by any other suitable method.

The electronic device 10 may further include one or more I/O interface(s) 102. The I/O interface(s) 102 may be in the form of typical mobile telephone I/O interfaces and may include one or more electrical connectors. As is typical, the I/O interface(s) 102 may be used to couple the electronic device 10 to a battery charger to charge a battery of a power supply unit (PSU) 104 within the electronic device 10. In addition, or in the alternative, the I/O interface(s) 102 may serve to connect the electronic device 10 to a headset assembly (e.g., a personal handsfree (PHF) device) that has a wired interface with the electronic device 10. Further, the I/O interface(s) 102 may serve to connect the electronic device 10 to a personal computer or other device via a data cable for the exchange of data. The electronic device 10 may receive operating power via the I/O interface(s) 102 when connected to a vehicle power adapter or an electricity outlet power adapter. The PSU 104 may supply power to operate the electronic device 10 in the absence of an external power source.

The electronic device 10 also may include a system clock 106 for clocking the various components of the electronic device 10, such as the control circuit 86 and the memory 84.

The electronic device 10 also may include a position data receiver 108, such as a global positioning system (GPS) receiver, Galileo satellite system receiver or the like. The position data receiver 108 may be involved in determining the location of the electronic device 10.

The electronic device 10 also may include a local wireless interface 110, such as an infrared transceiver and/or an RF interface (e.g., a Bluetooth interface), for establishing communication with an accessory, another mobile radio terminal, a computer or another device. For example, the local wireless interface 110 may operatively couple the electronic device 10 to a headset assembly (e.g., a PHF device) in an embodiment where the headset assembly has a corresponding wireless interface.

Figure 6:
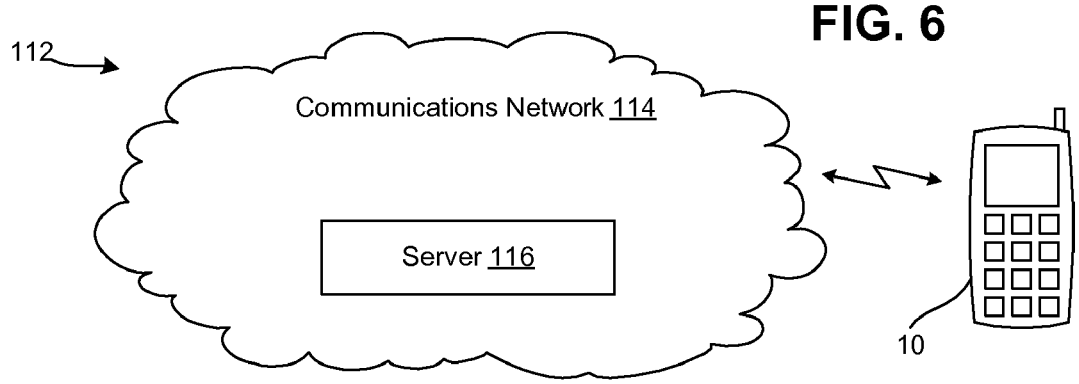
FIG. 6 is a schematic diagram of a communications system in which the electronic device of FIGS. 1 and 2 may operate.

With additional reference to FIG. 6, the electronic device 10 may be configured to operate as part of a communications system 112. The system 112 may include a communications network 114 having a server 116 (or servers) for managing calls placed by and destined to the electronic device 10, transmitting data to the electronic device 10 and carrying out any other support functions. The server 116 communicates with the electronic device 10 via a transmission medium. The transmission medium may be any appropriate device or assembly, including, for example, a communications tower (e.g., a cell tower), another mobile telephone, a wireless access point, a satellite, etc. Portions of the network may include wireless transmission pathways. The network 114 may support the communications activity of multiple electronic devices 10 and other types of end user devices. As will be appreciated, the server 116 may be configured as a typical computer system used to carry out server functions and may include a processor configured to execute software containing logical instructions that embody the functions of the server 116 and a memory to store such software.

Although certain embodiments have been shown and described, it is understood that equivalents and modifications falling within the scope of the appended claims will occur to others who are skilled in the art upon the reading and understanding of this specification.

What is claimed is:

1. A camera assembly, comprising:

an imaging sensor;

a lens assembly; and an autofocus assembly that selectively imparts a first displacement between the lens assembly and the imaging sensor and a second displacement between the lens assembly and the imaging sensor, wherein the autofocus assembly includes at least one positioner and an actuator, the actuator configured to move the positioner between a first position in which the positioner contacts a first surface that is in a first plane corresponding to the first displacement and second position in which the positioner contacts a second surface that is in a second plane corresponding to the second displacement, the first and second planes being offset so that a distance between the first displacement and the second displacement directly corresponds to a distance between the first and second planes;

wherein the first surface is a surface of a displacement member that includes a receptacle into which the positioner is received so that the positioner contacts the second surface.

2. The camera assembly of claim 1, wherein the actuator applies force to a control member that moves the positioner between the first and second positions.

3. The camera assembly of claim 2, wherein the control member traps the positioner in a receptacle of the control member.

4. The camera assembly of claim 3, wherein the receptacle of the control member is a through hole.

5. The camera assembly of claim 2, wherein force is applied to the lens assembly to maintain contact between the positioner and the first surface when the positioner is in the first position and between the positioner and the second surface when the positioner is in the second position.

6. The camera assembly of claim 2, wherein the actuator includes a shape memory alloy (SMA) member attached to the control member such that contraction of the SMA member achieves the movement of the control member to move the positioner from the first position to the second position.

7. The camera assembly of claim 6, wherein the actuator applies counter-force to the control member to return the positioner from the second position to the first position.

8. The camera assembly of claim 7, wherein the force and the counter-force are applied by contracting different portions of the same SMA member.

9. The camera assembly of claim 1, wherein the receptacle of the displacement member is a through hole.

10. The camera assembly of claim 9, wherein the second surface is a surface of a camera module housing located adjacent the displacement member, and the camera module housing retains the autofocus assembly and the lens assembly.

11. The camera assembly of claim 1, wherein the positioner further contacts a contact surface of the lens assembly to force the lens assembly between the first and second displacements.

12. The camera assembly of claim 11, wherein force is applied to the lens assembly to maintain contact between the lens assembly and the positioner.

13. The camera assembly of claim 12, wherein the force is applied by one or more springs.

14. The camera assembly of claim 1, wherein the second surface is part of a member other than the displacement member.

15. The camera assembly of claim 1, wherein a thickness of the displacement member defines the distance between the first displacement and the second displacement.

16. The camera assembly of claim 1, wherein the positioner is spherical.

17. The camera assembly of claim 1, wherein the camera assembly is part of a mobile telephone.

18. The camera assembly of claim 1, wherein the positioner is laterally trapped by a receptacle of a control member or is integral with the control member, and the actuator rotates the control member so as to circumferentially move the positioner about a longitudinal axis of the autofocus assembly and between the second position where the positioner is received in the receptacle of the displacement member and the first position, the movement from the second position to the first position including longitudinal movement of the positioner out of the receptacle and into contact with an upper surface of the displacement member that forms the first surface.

* * * * *